Nov. 2, 1926.  
H. WEICHSEL  
ALTERNATING CURRENT MOTOR  
Filed June 28, 1924   2 Sheets-Sheet 1

INVENTOR
Hans Weichsel
BY
ATTORNEY

Nov. 2, 1926.

H. WEICHSEL 1,605,882

ALTERNATING CURRENT MOTOR

Filed June 28, 1924    2 Sheets-Sheet 2

Patented Nov. 2, 1926.

1,605,882

UNITED STATES PATENT OFFICE.

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE.

ALTERNATING-CURRENT MOTOR.

Application filed June 28, 1924. Serial No. 722,903.

My invention relates to synchronous and asynchronous alternating current motors, the embodiment herein described in detail being a self-excited synchronous induction motor. One of the objects of the invention is to produce a machine of this type in which, without the use of revolving brushes, the primary or main inducing winding of the machine may be located on the stator and consequently the employment of slip rings carrying the line current may be avoided.

As will be readily understood my invention is particularly valuable in connection with high voltage machines in which difficulties are encountered in maintaining proper insulation of slip rings and terminals without frequent removal of "dust" accumulations which may readily produce short-circuits or "grounds".

My invention hereinafter described, also embodies means whereby the direct current exciting voltage increases with increasing load. Speaking generally, the machine comprises a stator provided with a main inducing winding and with an auxiliary inducing winding either of a suitably different number of poles or otherwise so arranged that the stator windings do not inductively interact. The rotor is provided with a commuted winding, and also with a polyphase winding in which current is induced by the auxiliary stator winding. This polyphase rotor winding is interconnected with the commuted winding as in usual converter practice whereby the commuted winding becomes a "converter" winding from which direct current can be derived at synchronism. The rotor is also provided with a direct current exciting winding in circuit with slip rings by means of which it is supplied with direct current through brushes cooperating with the commuted winding and connected to the slip rings.

Figure 1:
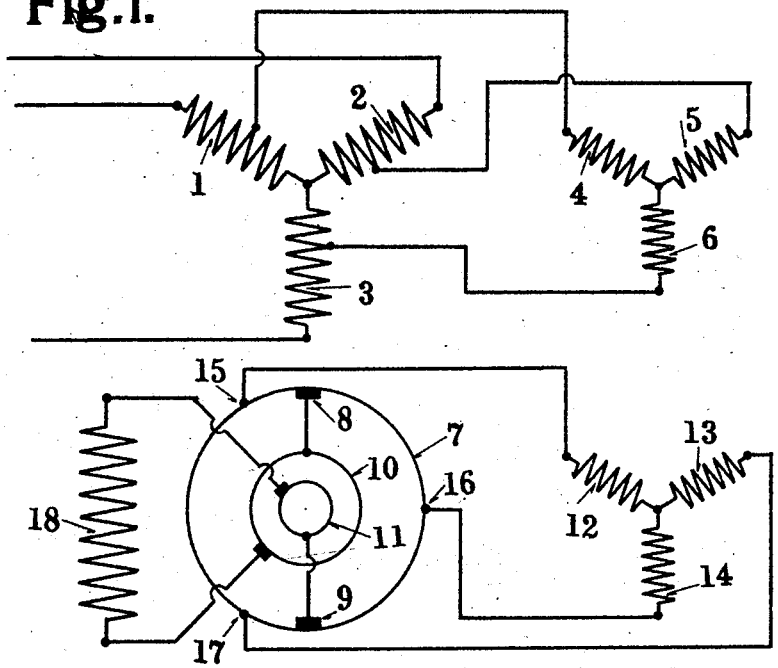
Figure 2:
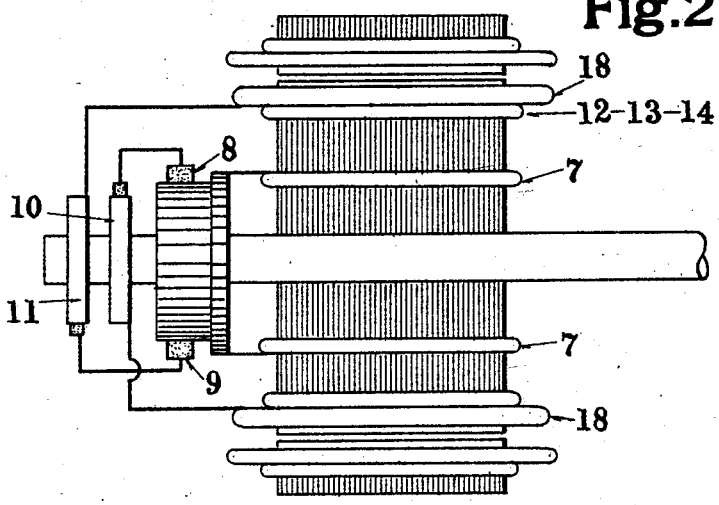
Figure 3:
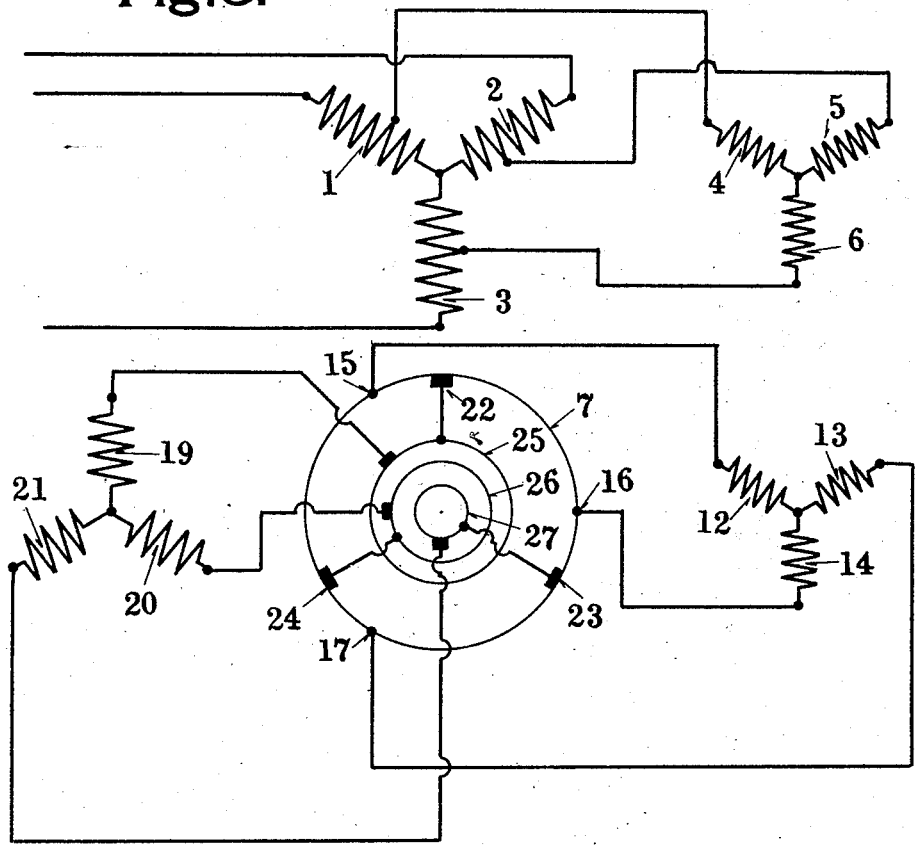

In the accompanying drawings Figure 1 diagrammatically illustrates the circuits of a machine embodying my invention; Figure 2 is a view showing the rotor and stator members of the machine in cross section and indicating the locations of the windings and diagrammatically setting forth the rotor circuits; and Figure 3 illustrates an asynchronous motor embodying my invention.

In the drawings I have indicated a three-phase machine with star connected main inducing stator windings 1, 2 and 3. The auxiliary polyphase stator windings 4, 5 and 6 are supplied with less than the full line voltage by being interconnected with the windings 1, 2 and 3 in the manner shown. As hereinabove indicated, the stator windings should be arranged so that they will not inductively interact, and one way of accomplishing this is, for example, to wind the auxiliary winding for half the number of poles of the main inducing winding.

The rotor is provided with a commuted winding 7, with which brushes 8 and 9 cooperate, and with slip rings 10 and 11. As shown in Figure 2, the commuted winding 7 is located in embedded slots in the rotor in order to prevent undesired interaction between it and the other rotor windings.

The rotor is also provided with polyphase windings 12, 13 and 14 having the same number of poles as stator windings 4, 5 and 6 located in peripheral slots. These windings 12, 13 and 14 are permanently interconnected with the commuted winding 7 at points 15, 16 and 17. The commuted winding 7 has the same number of poles as windings 12, 13 and 14 and is so connected to said windings that the field produced by the commuted winding, due to the voltage impressed from 12, 13 and 14 is stationary in space when the rotor runs synchronously with respect to the field produced by the windings 1, 2, 3. Peripheral slots on the rotor also carry the direct current exciting winding 18 in circuit, by means of brushes, with slip rings 10 and 11, which slip rings are in turn connected to brushes 8 and 9 respectively. The winding 18 is wound to produce the same number of poles as the main stator winding.

Referring to the operation of the machine, the main windings 1, 2 and 3 produce the main rotating torque producing field of the machine. The windings 4, 5 and 6 also produce a field (rotating in the same direction as the main field) which induces a polyphase voltage in the rotor windings 12, 13 and 14. This polyphase voltage being impressed on the commuted winding 7 will be converted into a direct current voltage which is collected by the brushes 8 and 9 when the machine is operating in synchronism with the main field produced by the stator windings 1, 2 and 3. The direct current voltage appearing at brushes 8 and 9 is impressed on the exciting winding 18 which thereby produces the necessary direct current field excitation which enables the motor to operate as a synchronous machine. The brushes 8 and 9 are so located that at no load a relatively small voltage appears across these brushes and when the machine becomes loaded the voltage increases due to the relative shifting of the axis of the winding 18 with respect to the axis of the main rotating field produced by windings 1, 2 and 3. By locating the brushes as described the direct current excitation of the machine is caused to increase with increasing load.

The connection of winding 18 to the commuted winding is so made that at speeds below synchronism the voltage conductively impressed on winding 18 and the voltage induced therein by the main stator winding cooperate in the production of the current upon which the synchronizing torque depends.

In Figure 3 I have shown an asynchronous motor embodying my invention. This motor differs from the motor of Figure 2 in that the winding 18 is replaced by a polyphase winding 19, 20, 21 having the same number of poles as the main stator winding and the commuted winding is provided with three brushes 22, 23 and 24 connected through slip rings 25, 26 and 27 to the polyphase winding. The brushes supply polyphase current and are so positioned as to secure the phase relations necessary to produce the desired line power factor.

Having fully described my invention, what I claim as new and desire to secure by Letters Patent of the United States is:

1. In an alternating current motor, the combination of a stator having a main inducing winding and an auxiliary inducing winding, a rotor provided with a commuted winding and with an induced winding connected thereto, and an exciting winding on the rotor, said exciting winding being in circuit with the commuted winding.

2. In an alternating current motor, the combination of a stator having a main inducing winding and an auxiliary inducing winding, said windings not having good inductive relation, a rotor provided with a commuted winding and with an induced winding cooperating with the auxiliary stator winding and connected to the commuted winding and an exciting winding on the rotor, said exciting winding being in circuit with the commuted winding.

3. In an alternating current motor, the combination of a stator having a main inducing winding and an auxiliary inducing winding, a rotor provided with an induced winding and an exciting winding, a commuted winding on the rotor connected to the induced winding but not in good inductive relation therewith, and brushes cooperating with the commuted winding and in circuit with the exciting winding.

4. In an alternating current motor, the combination of a stator, having a main inducing winding and an auxiliary inducing winding, a rotor provided with an induced winding and an exciting winding, a commuted winding on the rotor connected to the induced winding but not in good inductive relation therewith, and brushes cooperating with the commuted winding and in circuit with the exciting winding, said brushes being displaced from the axis of the field produced by the commuted winding during synchronous operation under load.

5. In an alternating current motor, the combination of a stator having a main inducing winding and an auxiliary winding, said windings not having good inductive relation, a rotor provided with an exciting winding and with an induced winding cooperating with the auxiliary stator winding and not in good inductive relation with the main stator winding, a commuted winding on the rotor connected to the induced winding but not in good inductive relation therewith, and brushes cooperating with the commuted winding and in circuit with the exciting winding, said exciting winding cooperating with the main inducing winding and not having good inductive relation with the auxiliary inducing winding.

In testimony whereof, I have hereunto set my hand this the 26th day of June, 1924.

HANS WEICHSEL.